INVENTOR
DOUGLAS P. HINES

United States Patent Office 3,565,761
Patented Feb. 23, 1971

3,565,761
REACTOR STEAM CIRCULATOR
Douglas P. Hines, Saratoga, Calif., assignor to General
Electric Company, a corporation of New York
Filed Jan. 29, 1968, Ser. No. 701,228
Int. Cl. G21c 15/24
U.S. Cl. 176—56                           1 Claim

ABSTRACT OF THE DISCLOSURE

A steam circulating system for a steam cooled nuclear reactor is disclosed. This system includes a steam thermopresser for driving saturated steam coolant through the reactor core and associated piping.

BACKGROUND OF THE INVENTION

Nuclear chain fission reactions and the reactors in which they take place are now well known. A typical reactor includes a chain reacting assembly or core made up of nuclear fuel material contained in fuel elements. The fuel material is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by heat energy released in the fuel material during the fission reaction. The heated coolant then leaves the reactor, the heat energy is used to perform useful work, and the now cooled coolant is recycled back to the reactor.

In typical commercial reactors, the coolant is water, which may be heated under pressure or evaporated in the core. Recently, reactors have been developed using steam as the coolant. In reactors of this type, saturated steam enters the reactor, is superheated as it passes through the core, leaves the reactor where it is desuperheated while performing useful work, and is recycled to the reactor. This system is preferred for many applications, since steam at high temperatures and pressures is often more useful than the lower pressure and temperature steam produced by conventional pressurized water and boiling water reactors. For example, electrical power generating turbines are generally more efficient and economical when driven by superheated rather than saturated steam.

A major problem, however, with steam-cooled reactors results from the requirement that a major portion of the superheated steam produced in the reactor be sent to a heat exchanger where it is used to evaporate feed water. The resulting mixture of evaporated feed water and desuperheated reactor steam must then be pumped back to the reactor core. In this system, generally known as the "Loeffler boiler system" large amounts of energy must be expended in pumping large quantities of saturated steam and some energy is wasted in the mixing process. Also, relatively large openings in the reactor pressure vessel are required for the admission of this steam and relatively extensive piping systems are required in the steam generator, blower and associated piping externally of the reactor.

Clearly, great savings in capital and operating costs can be obtained through relatively small improvements in steam recirculation systems.

SUMMARY OF THE INVENTION

It is, therefore, an object of this invention to provide a steam recirculation system overcoming the above-noted problems.

Another object of this invention is to provide a simple and economical steam-cooled nuclear reactor system.

Another object of this invention is to provide a means for recirculating steam which is both economical and mechanically efficient.

The above objects, and others, are accomplished in accordance with this invention by providing a steam recirculation system for steam cooled reactors which includes a steam thermopresser to circulate steam coolant through the reactor core. This device includes a nozzle through which a portion of the superheated steam from the reactor core passes, with means to inject water at the narrow region of the nozzle. As the superheated steam accelerates through the converging inlet of the nozzle, a drop in pressure occurs. When the density is increased by the injected water, the pressure recovery during deceleration as the nozzle diverges into a diffuser section and the injected water evaporates while desuperheating the superheated steam, is greater than the pressure drop required for the acceleration process. Thus, a net increase in the stagnation pressure will have occurred. Thus, a large quantity of saturated steam at high pressure leaves the steam thermopresser and is returned to the reactor core.

Recently, a somewhat similar device, called the "aerothermopresser" has been developed for use, typically, in improving the efficiency of gas turbines. In this device, which is structurally similar to the steam thermopresser, water is injected into turbine exhaust gases passing through the thermopresser. This increases the stagnation pressure at the thermopresser exit, improving the efficiency of the gas turbine. The aerothermopresser is described in detail by a A. H. Shapiro et al., in an article entitled, "The Aerothermopresser—A Device for Improving the Performance of a Gas Turbine Power Plant," Transactions of ASME, April 1956, pp. 617–653. The theoretical basis for this device is further detailed by A. J. Erickson, in "A Theoretical and Experimental Investigation of the Aerothermopresser Process," Office of Naval Research, M.I.T. Division of Industrial Cooperation, DIC 5–6985, May 1958.

The steam thermopresser differs from the aerothermopresser in that it is part of a closed loop recirculation system, rather than an open system. The steam thermopresser uses superheated steam as the driving gas, which is desuperheated and becomes an indistinguishable part of the high pressure saturated steam product, when mixed with the vaporized injected water. This system has unexpectedly great utility in nuclear reactors and power plants using saturated steam as the core coolant.

BRIEF DESCRIPTION OF THE DRAWING

Various details of the invention and several preferred embodiments of the invention are shown in the drawings, wherein.

DETAILED DESCRIPTION OF THE INVENTION

Figure 1:
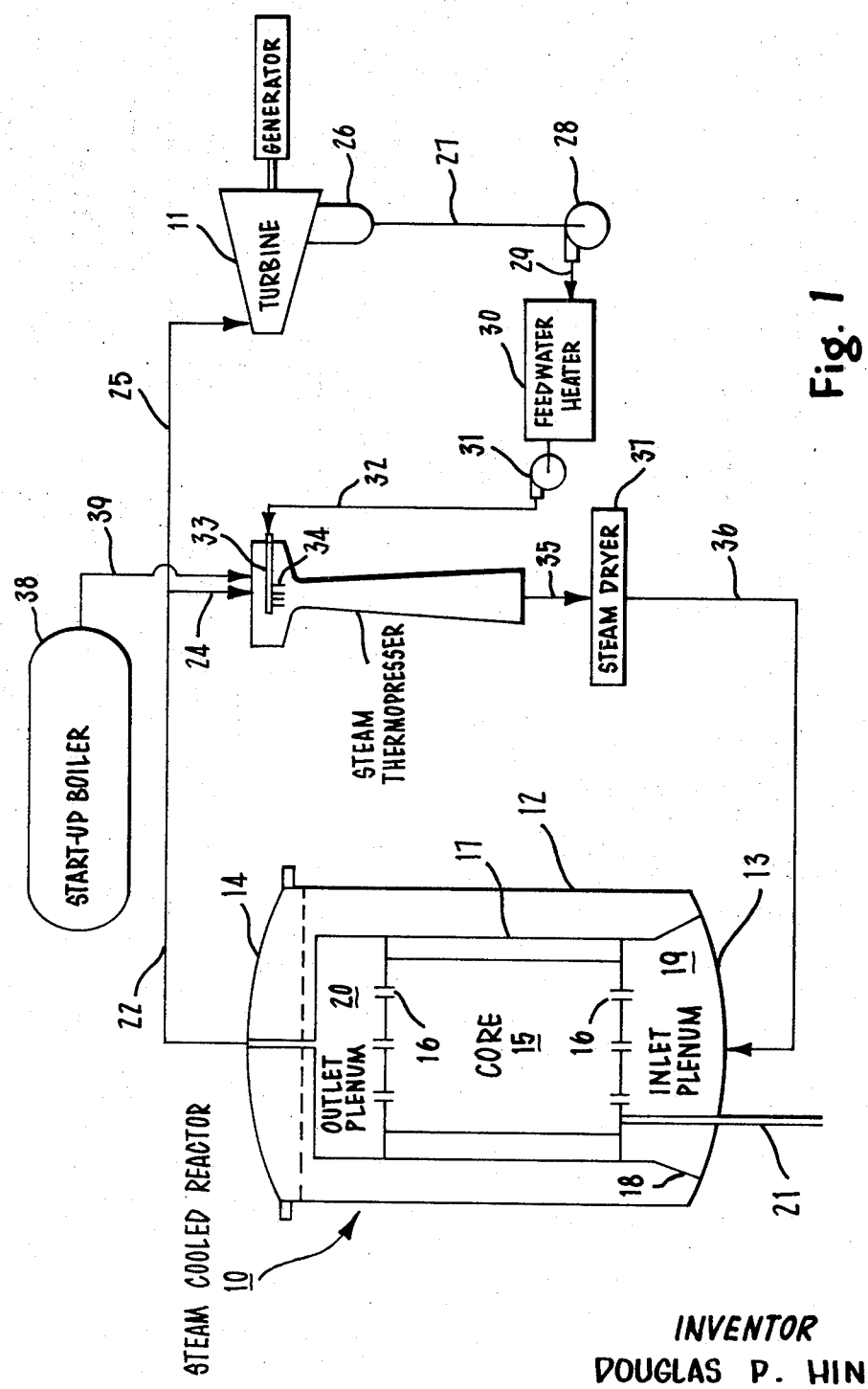
FIG. 1 shows a simple schematic flow sheet for a nuclear power plant using a steam thermopresser according to this invention.

Referring now to FIG. 1, there is seen a simple schematic diagram of a nuclear power plant, including a nuclear reactor 11 to supply steam to turbine 11.

Reactor 10 in this instance is of the "steam cooled" type. Reactor 10 includes a generally cylindrical pressure vessel 12 closed at the bottom by a dish-shaped lower head 13 and at the top by a removable dome-shaped upper head 14. Within the pressure vessel is located the core 15 containing nuclear fuel material in a heat generating arrangement. Vertical openings through the core, generally indicated at 16, permit a coolant to pass through the core and remove heat therefrom. Core 15 is located within a shroud 17 which is mounted on head 13 by skirt 18. Within shroud 17 and below core 15 is located an inlet plenum 19 into which saturated steam coolant passes before moving through the core. Also within shroud 17, above core 15, is located an outlet plenum 20 to which the now-superheated steam coolant from the core passes. In a steam-cooled reactor, substantially saturated steam is directed into lower plenum 19 from which it flows to core 15 where it becomes superheated. The now superheated coolant reaches outlet plenum 20 from which it is fed to a load, such as turbine 11, producing useful work, such as by driving an electrical generator. Control rods, one of which is schematically indicated at 21, are used to adjust the heat output of core 15, as desired. The space between shroud 17 and pressure vessel 12 is filled with water. Superheated steam leaves output plenum 20 through line 22. A major portion of the superheated steam is directed to steam thermopresser 23 through line 24. The remaining minor portion of the superheated steam is directed to turbine 11 through line 25. After passing through the turbine, this steam is condensed in main condenser 26. The resulting condensate is pumped through line 27, condensate pump 28, and line 29 to feedwater preheater 30 where extraction steam from turbine 11 heats the water to the desired temperature. The water is pumped by feedwater pump 31 through line 32 to the steam thermopresser.

As discussed above, as the large quantity of superheated steam enters the narrow thermopresser throat from line 24, a fine spray of feedwater is injected into the superheated steam at the throat section from spray nozzles 34 mounted on manifold 33. The throat section may consist of a short cylindrical section, a short curved section, or may merely be the circumferentially line where a converging inlet section meets a diverging diffuser section. Generally, the diffuser section makes up at least about 80% of the length of the thermopresser. The superheated steam is desuperheated as it gives up heat to vaporize the water droplets. The now-desuperheated steam mixes with the vaporized water, forming homogeneous saturated steam. As the mixture passes through the diffuser, velocity decreases and pressure increases. This substantially saturated steam at high pressure returns through lines 35 and 36 to the reactor inlet plenum. Thus, all of the steam which left the reactor in a superheated condition returns as saturated steam after a portion of the superheated steam has performed useful work. If desired, a steam dryer 37 may be included in saturated steam return lines 35 and 36 to insure that an undesirably large amount of entrained water does not reach inlet plenum 19. The substantially saturated steam entering plenum 19 may be slightly superheated or may contain a small amount of entrained water, if desired.

In starting up this plant, it is necessary to provide an initial source of steam coolant. A separate, fossil-fueled boiler 38 is provided to initially feed steam to thermopresser 23 through line 39. The start-up procedure is more fully described in the copending application of C. C. Ripley, entitled "Steam Cooled Reactor Operation," Ser. No. 701,229, filed concurrently with this application.

Figure 2:
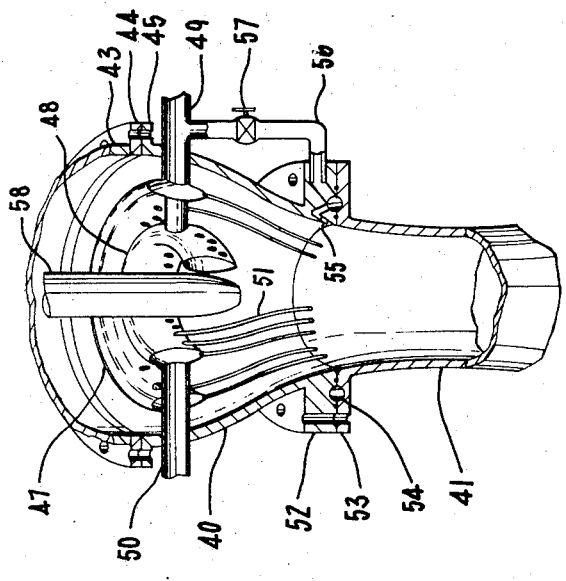
FIG. 2 shows a preferred embodiment of a steam thermopresser.
Figure 2:
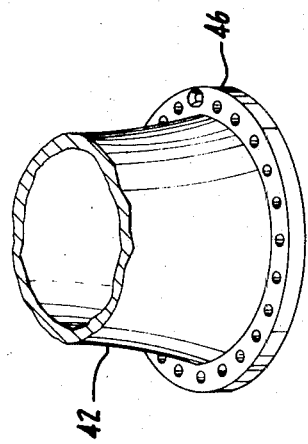

A detailed view, partly broken away, of a steam thermopresser especially useful in the system of this invention is shown in FIG. 2. The body of the thermopresser includes a sharply converging inlet section 40, a narrow throat section 41, and a diverging diffuser section 42. Inlet pipe 43 is secured to the thermopresser body by flanges 44 and 45. A flange 46 is provided at the end of diffuser section 42 for connection to reactor core feed piping. Superheated steam enters the inlet section, increases in velocity in the throat section to a velocity of up to about 0.9 sonic velocity, and then increases in pressure in the diffuser section. At or just before the throat section, feedwater is sprayed into the thermopresser in the form of very fine droplets. One spray system which is especially suitable is shown in FIG. 2. Two streamlined manifold rings 47 and 48 are located in inlet section 40. Water is fed to rings 47 and 48 through pipes 49 and 50, respectively, which also serve to support the rings in position. A plurality of narrow tubes 51 extend from manifold rings 47 and 48 into throat section 41. Only a few of these tubes are shown in FIG. 2, for clarity. Each tube has one or more small spray holes in its downstream end through which water is sprayed into throat section 41 as fine droplets, whereupon it flashes into steam. Flanges 52 and 53 which secure inlet section 40 to throat section 41 have a toroidal manifold 54 therebetween which serves as a manifold directing water to additional spray nozzles 55 located in openings in the wall of inlet section 40. Only one of the several nozzles 55 is shown for clarity. Feedwater is fed to this manifold 54 through pipe 56 controlled by valve 57. Steam leakage between flanges 52 and 53 is prevented by O-rings adjacent manifold 54 between the flanges. A single large nozzle 58 is provided for the admission of steam from a start-up boiler during plant start-up.

For optimum steam thermopresser performance, the fluid density should not be increased until the maximum velocity is reached. Thus, the spray of water droplets into the superheated steam should take place at or just before the narrowest portion of throat 41. To get highest output pressure, the maximum velocity should be as high as possible. To minimize friction losses, the length to diameter ratio of the diffuser section should be as small as possible. A ratio of overall length to throat diameter in the range of about 5:1 to about 30:1 has been found to give excellent results. Generally, at least about 80% of the length of the thermopresser is in the diffuser section. The diffuser should be long enough to give optimum mixing of the driving steam and the evaporated water and optimum pressure recovery, but not so long as to give excessive friction losses at the walls. Thus, an optimum diffuser length for a given application may be determined experimentally by one skilled in the art within the above range.

It is highly desirable that the water spray comprise very small droplets, to decrease energy losses in accelerating droplets to steam velocity. Best results are obtained where the water droplets have an average diameter in the range of from about 1 to about 20 microns.

Figure 3:
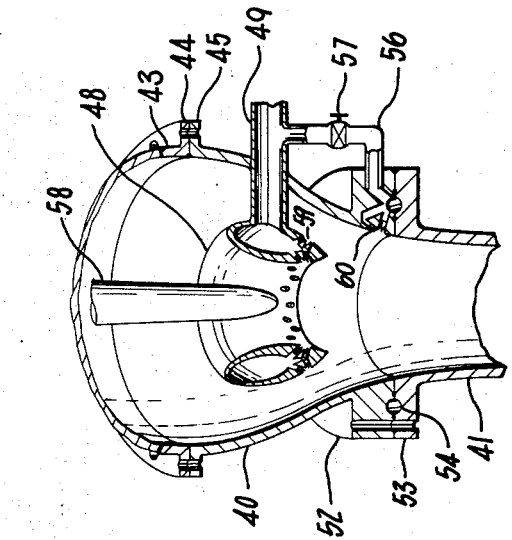
FIG. 3 shows an alternative inlet and spray nozzle assembly useful in the steam thermopresser shown in FIG. 2.

An alternative water spray system is shown in FIG. 3. Here, manifold 48 is located in inlet section 40 near throat section 41. Feedwater is fed to manifold 48 through pipe 49 which also serves to support the manifold. The spray means here consists of a plurality of pairs of small water jets 59, with the two jets from each pair impinging so as to produce a fine spray of very small droplets. A plurality of similar pairs of jets 60 are located around the wall of inlet section 40. Only one of these pairs of jets 60 is shown for clarity.

Any suitable spray means which is capable of rapidly spraying very fine droplets may be used with a center or wall manifold such as shown in FIGS. 2 and 3.

Figure 4A:
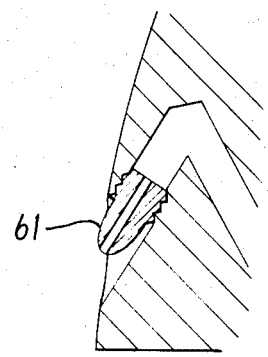
FIGS. 4a through 4f show various alternate arrangements for feeding water droplets into a steam thermopresser.
Figure 4B:
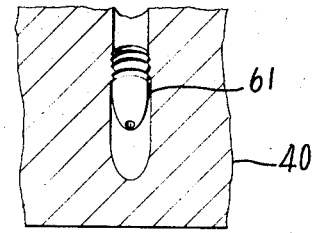
Figure 4C:
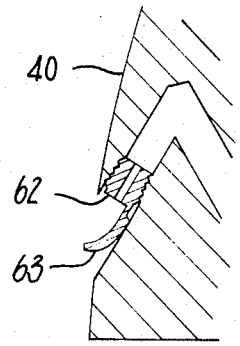
Figure 4D:
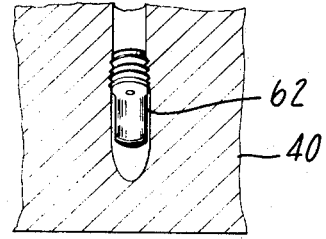
Figure 4E:
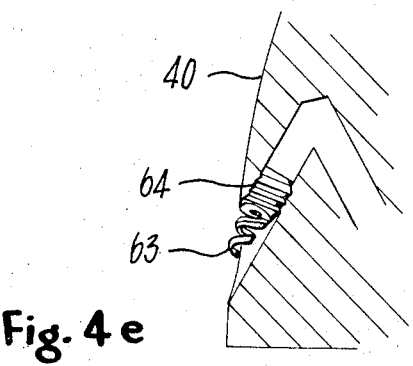
Figure 4F:
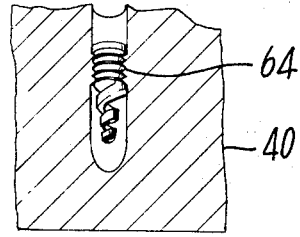

FIGS. 4a through 4f show pairs of front and cut-away side views of several alternative embodiments of spray heads especially suitable for use in a steam thermopresser. Each of these spray heads is externally threaded to fit into internally threaded openings in inlet wall 40 as shown in FIGS. 2 and 3 and/or a manifold such as shown at 48 in FIG. 3. Spray head 61 as seen in FIGS. 4a and 4b has a slot-shaped opening arranged transverse to the center-line of the thermopresser. This spray head produces a fan-shaped spray of very fine droplets. Spray head 62 as seen in FIGS. 4c and 4d has a single generally cylindrical opening which directs a stream of water against a deflector 63 producing a fan-shaped spray. Spray head 64 as seen in FIGS. 4e and 4f has a single cylindrical opening which directs a water stream against a generally helical band 65, producing a generally cone-shaped spray.

Whichever spray system is chosen, it should produce a very fine spray of water droplets concentrated in the region of highest steam velocity. Excessively large water droplets result in an undesirable energy loss due to aerodynamic drag as the droplets are accelerated before they evaporate.

Figure 5:
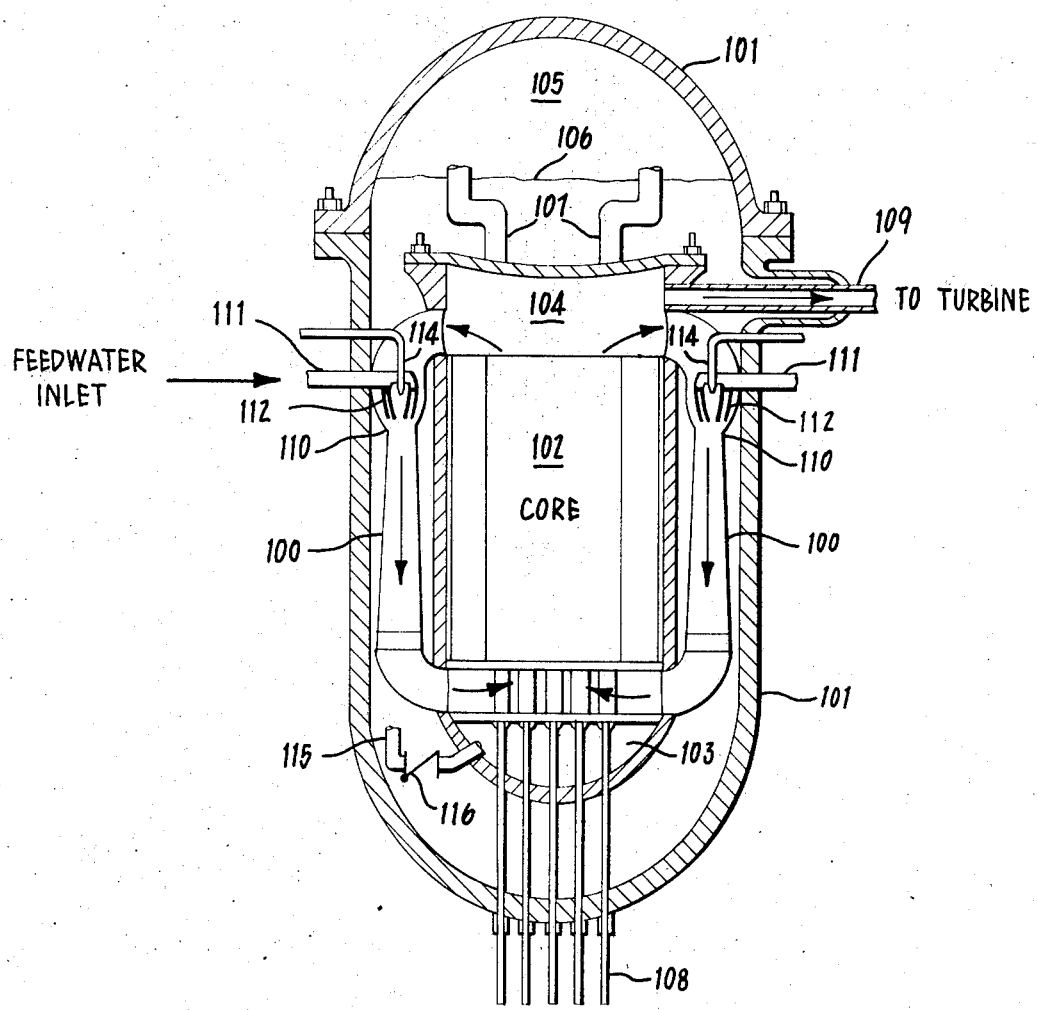
FIG. 5 shows a preferred arrangement for a steam thermopresser in a nuclear reactor pressure vessel.

An especially preferred arrangement of a steam thermopresser in a nuclear reactor is shown in FIG. 5. This arrangement is suitable for use, for example, in a power plant such as is shown in FIG. 1.

As seen in FIG. 5, the thermopressers 100, only two of which are shown for clarity, are located within the pressure vessel 101 of the reactor. Pressure vessel 101 has a removable head portion permitting easy access to the core and thermopresser array for refueling, repair, etc. Thermopressers 100 are located in a water filled annulus surrounding core 102. Vertical passages through core 102 permit coolant to pass through the core from inlet plenum 103 to outlet plenum 104. The outlet plenum is vented to steam space 105 above water line 106 by means of vents 107. During operation, saturated steam enters the core from the inlet plenum, is heated to the desired degree of superheat in the core under control by control rods 108, and passes to the outlet plenum. A portion of the superheated steam leaves the reactor through pipe 109 to the turbine or other load. The remainder of the superheated steam passes downwardly through thermopressers 100 to the inlet plenum for recirculation. As this portion passes through the throat sections 110 of the thermopressers, water entering through pipes 111 is sprayed from spray nozzles 112 as finely divided droplets into the superheated steam which is moving at maximum velocity. While the schematic drawing shows separate feedwater pipes 111 each penetrating pressure vessel 101 for clarity, in practice it is preferred to have a single penetration, with an annular manifold delivering feedwater to each thermopresser spray nozzle array. The water droplets flash into steam while simultaneously desuperheating the driving stream. As the mixture passes through the diffuser sections of the thermopressors, pressure increases so that saturated steam of the desired quantity at a suitable pressure enters inlet plenum 103.

Jet pump nozzles 114 are provided for the introduction of steam from an outside source during reactor start-up, as is further described in copending application Ser. No. 701,229 filed concurrently herewith. Pipe 115, with check valve 116 is provided so that water may be admitted into the core during reactor shut-down periods.

While the embodiment shown in FIG. 5 uses steam up-flow through the reactor core and down-flow through the thermopressers, other arrangements may be used, if desired. For example, by merely reversing the arrangement of the thermopressers, steam may be made to flow up through the thermopressers and down through the core, with the superheated steam exit to the turbine then being located at the lower plenum. Also, the thermopresser array could be located coaxially at one end of the core, so that steam would pass in the same direction through the thermopressers and core. Generally, however, the arrangement shown in FIG. 5 will be preferred, since it is compact, easily serviced, and permits superheated steam to be taken off near the top of the reactor for use in the turbine.

DESCRIPTION OF A PREFERRED EMBODIMENT

A typical large nuclear power plant of the sort schematically shown in FIG. 1, using an arrangement of steam thermopressers as shown in FIG. 5, produces about 1000 MWt. It has been found that such a plant has an energy conversion efficiency of about 41%, so the reactor core is designed to produce about 2424 MWt. This plant produces about $28 \times 10^6$ lb./hr. of superheated steam at about 1400 p.s.i.a. and about 950° F. About $8.7 \times 10^6$ lb./hr. of the superheated steam is piped to the turbine, which it reaches at a pressure of about 1350 p.s.i.a. The remaining $19.3 \times 10^6$ lb./hr. of superheated steam enters the thermopressers. Four thermopressers are arranged in the annular space between the reactor core and the pressure vessel to receive this steam. Each thermopresser has a length of about 10 feet from the entrance to the converging inlet section to the end of the diverging diffuser section. The thermopressers include a means for spraying feedwater into the narrowest portion of the throat of the sort shown in FIG. 2. The water injection point is located at the throat, about 2.1 feet from the entrance to the inlet section. The entrance diameter is about 2.08 feet, the throat diameter is about 1.05 feet, and the diffuser exit diameter is about 2 feet. About $2.2 \times 10^6$ lb./hr. of feedwater at a temperature of about 500° F. and a pressure of about 1500 p.s.i.a. is sprayed into the throat section of each thermopresser. At the entrance to the inlet section, steam velocity is about 262 ft./sec., pressure is about 1392 p.s.i.a., and temperature of the superheated steam is about 948° F. At the throat section, velocity has increased to about 1209 ft./sec. while steam temperature has dropped to about 902° F. and pressure to about 1152 p.s.i.a. About $7 \times 10^6$ lb./hr. of saturated steam, at a temperature of about 600° F., pressure of about 1509 p.s.i.a., and velocity of about 200 ft./sec. leaves each diffuser exit and enters the core inlet plenum. This saturated steam then passes through the core where it is again superheated and the cycle is repeated.

Thus, this system is seen to be highly compact and efficient, with no large external steam pumps and relatively few large reactor pressure vessel penetrations.

Although specific arrangements and proportions have been described in the above description of a preferred embodiment, other suitable arrangements and components may be used as indicated above, with similar results.

Other modifications and ramifications of the present invention will occur to those skilled in the art upon reading the present disclosure. These are intended to be included within the scope of this invention.

I claim:

1. A nuclear power plant comprising: a nuclear reactor including a nuclear chain reacting core having an inlet plenum at the bottom thereof and an outlet plenum at the top thereof through which substantially saturated steam is circulated to be superheated, said core being enclosed in a pressure vessel; means for applying a first portion of the superheated steam from the outlet plenum of said core to a load; a plurality of thermopressers located in an annulus between said core and said pressure vessel for circulating said saturated steam through said core, each thermopresser including a body having a converging inlet section, a throat section, and a diverging diffuser section; means for applying a second portion of the superheated steam from the outlet plenum of said core to the inlets of said thermopressers; spray means for spraying feedwater into the steam stream in about the throat section of each thermopresser whereby said feedwater is evaporated and said superheated steam is desuperheated and whereby the resultant saturated steam is pressurized in the diffuser sections; and a steam passage for applying said pressurized saturated steam to the inlet plenum of said core for circulation of said saturated steam upwardly through said core.

References Cited

UNITED STATES PATENTS

| | | | |
|---|---|---|---|
| 3,274,065 | 9/1966 | Kieralf et al. | 176—56 |
| 3,378,456 | 4/1968 | Roberts | 176—56 |
| 3,400,047 | 9/1968 | Howard | 176—56 |
| 3,414,473 | 12/1968 | Schluderberg et al. | 176—56 |

REUBEN EPSTEIN, Primary Examiner